US012008830B2

(12) United States Patent
Kumar et al.

(10) Patent No.: US 12,008,830 B2
(45) Date of Patent: Jun. 11, 2024

(54) SYSTEM FOR TEMPLATE INVARIANT INFORMATION EXTRACTION

(71) Applicant: Infrrd Inc, San Jose, CA (US)

(72) Inventors: Deepak Kumar, Bengaluru (IN); Jianglong He, New York, NY (US)

(73) Assignee: INFRRD INC., San Jose, CA (US)

( * ) Notice: Subject to any disclaimer, the term of this patent is extended or adjusted under 35 U.S.C. 154(b) by 407 days.

(21) Appl. No.: 17/570,384

(22) Filed: Jan. 7, 2022

(65) Prior Publication Data
US 2022/0130163 A1    Apr. 28, 2022

(51) Int. Cl.
*G06V 30/416*    (2022.01)
*G06F 16/93*    (2019.01)
*G06F 40/186*    (2020.01)
*G06F 40/295*    (2020.01)
*G06N 3/045*    (2023.01)

(52) U.S. Cl.
CPC ............ *G06V 30/416* (2022.01); *G06F 16/93* (2019.01); *G06F 40/186* (2020.01); *G06F 40/295* (2020.01); *G06N 3/045* (2023.01)

(58) Field of Classification Search
CPC .......... G06N 3/08; G06N 20/00; G06N 3/045; G06N 3/02; G06F 16/35; G06F 40/295; G06F 16/93; G06F 40/186; G06V 30/416
See application file for complete search history.

(56) References Cited

U.S. PATENT DOCUMENTS 11,361,151 B1 *    6/2022    Guberman ............... G06N 3/08
11,574,118 B2 *    2/2023    Gohari ................. G06F 40/194

2018/0336415 A1 *    11/2018    Anorga ................... G06N 20/00
2019/0220660 A1 *    7/2019    Cali ....................... G06V 30/40
2019/0286896 A1 *    9/2019    Wyle ...................... G06V 30/416
2021/0064860 A1 *    3/2021    Tuma ..................... G06F 16/93
2021/0150338 A1 *    5/2021    Semenov ............. G06V 10/763
(Continued)

FOREIGN PATENT DOCUMENTS

CN          110990570 A  *   4/2020
WO     WO-2022035942 A1  *   2/2022  ............. G06F 16/35

OTHER PUBLICATIONS

Liu et al., "Entity recognition from clinical texts via recurrent neural network" (Year: 2016).*

(Continued)

*Primary Examiner* — Dung Hong

(57) ABSTRACT

A system for template invariant information extraction. The system comprises of processor, a first neural network model and a second neural network model. The processor is configured to recognize and extract entities and location of the entities in the input document using the first neural network model. The processor is further configured to classify whether the input document belongs to at least a template of the documents of the first training dataset using the second neural network model. The second neural network model comprises a linear classifier configured to generate a plurality of confidence scores for the input document corresponding to a unique template of the documents of the first training dataset. A threshold value to classify the input document belonging to template of the documents of the first training dataset is determined, Classification is done by comparing the confidence score with the threshold value.

12 Claims, 12 Drawing Sheets

(56) References Cited

U.S. PATENT DOCUMENTS

| | | | |
|---|---|---|---|
| 2022/0156300 A1* | 5/2022 | Paruchuri | G06N 3/08 |
| 2023/0101817 A1* | 3/2023 | Sinha | G06F 16/93 |
| | | | 707/722 |
| 2023/0132720 A1* | 5/2023 | Khmaissia | G06N 3/088 |
| | | | 382/181 |

OTHER PUBLICATIONS

Carbonell, "A neural model for text localization, transcription and named entity recognition in full pages" (Year: 2020).*

* cited by examiner

| y | x | h | w |
|---|---|---|---|
| $(y^i)$ | $(x^i)$ | $(h^i)$ | $(w^i)$ |

| $y_{difference}$ | $x_{difference}$ | h | w |
|---|---|---|---|
| $(y^i-y^j)$ | $(x^i-x^j)$ | $(h^j)$ | $(w^j)$ |

902

900

Infrrd.ai

INVOICE

2001 Gateway Pl Suite 301E
San Jose, CA 95110

Bill To

SomeCompany
2078 Gateway Pl
San Jose, CA 95110

Invoice #  A123152237

Invoice Date  10/29/2021

| DESCRIPTION | AMOUNT |
|---|---|
| services | 100.00 |
| maintainance | 50.00 |
| service scaling | 200.00 |
| TOTAL | $350.00 |

ORG

ADDRESS

ORG
ADDRESS

INVOICE NO
DATE

AMOUNT
AMOUNT
AMOUNT
TOTAL

FIG. 9C

2001 Gateway Pl Suite 301E
San Jose, CA 95110

Bill To                                  Invoice #        A123152237

SomeCompany                              Invoice Date     10/29/2021
2078 Gateway Pl
San Jose, CA 95110

| DESCRIPTION | AMOUNT |
|---|---|
| services | 100.00 |
| maintainance | 50.00 |
| service scaling | 200.00 |
| INVOICE TOTAL | $350.00 |

FIG. 10C

SYSTEM FOR TEMPLATE INVARIANT INFORMATION EXTRACTION

BACKGROUND

Field of Invention

The disclosed subject matter relates to the field of data extraction from documents. More particularly, but not exclusively, the subject matter relates to the field of template invariant information extraction.

Discussion of Prior Art

Extraction of information from a digital document or a digitally scanned document is well known. Optical Character Recognition (OCR) may be one among the many methods employed for extracting information. Information may be extracted basically from two types of documents i.e., documents with static text and documents with dynamic text. Documents with static text refers to books, textbooks, manuals and journals, among others, wherein text in such documents do not change. On the other hand, documents with dynamic text refers to financial statements, shopping bills, forms, invoices and receipts, among others, wherein text in such documents change frequently. Extraction of information from documents with static text can be extracted by humans as a one-time task. However, extraction of information from documents with dynamic text by humans may be tiresome and may end up causing errors during the extraction process.

Extraction of information (may also be referred to as "fields") from documents with static fields is simple in comparison to extraction of information from documents with dynamic fields, as documents with dynamic fields are generated with lots of variations which refer to change in the location of fields within the document, and format or structure of the document. In addition, the documents may be semi-structured or structured in nature with a specific location for some fields of the dynamic text. A machine may be required for efficient extraction of information from documents with dynamic fields and also for reducing the chances of errors during extraction of information.

A machine needs to understand the document clearly to perform the process of information extraction on the document. For a machine to understand and extract fields from a document, the machine has to be provided with a set of artificially framed rules. Each of the artificially framed rules is configured to correspond to one field of a document, wherein the machine refers to a corresponding rule during extraction of fields from the documents. For example, a set of rules may have to be framed to extract the date, which is embedded or present in a document. Assuming that date in some documents appears on the top-right corner section of the document, a set of rules may be framed to determine and extract the date from the document. These rules are fed into the machine by the humans after carefully understanding the document. The set of rules are configured to look for patterns of date in the top-right section of the document.

However, the same type of documents may not always be fed to the machine for extracting the information. Hence, rules have to be prepared every time information is required to be extracted from a different type of document. Humans can perform the task of preparing rules to handle a few variations in the document. As variations grow, the number of rules is bound to increase exponentially. The example provided above may refer to one field in a document such as date. Managing all the rules becomes extremely difficult if there are many fields such as application number, identification number, contact address, contact person, location, for just a couple of documents.

The difficulties encountered by the machine in the foregoing may be overcome through training of the machine to handle the variations in the documents. However, the machine generally requires a large number of documents for a single variation in order to understand the structure of the entities, the relationship between the entities and the relationship between neighbour text and entities. This is a limitation for semi-structured or structured documents with a dynamic text or field, which may come in a set of small numbers such as a student applying for a college admission, a job aspirant applying for a job in a company. The amount of data generated which can be fed into the machine is very less and the machine may not have the ability to understand the document completely.

In yet another approach in data extraction, a document fed to a machine is first scanned to perform template matching in order to reduce the possible number of templates considered for entity/information extraction. However, in the conventional approach the machine performs template matching using images and patterns in the document, and it is much easier to train a machine to perform template matching using images and patterns. In such cases, the machine performs template matching when the document comprises images and patterns and fails to perform template extraction if the document fails to disclose any image and pattern. Whenever a new template is fed to the machine, additional input with respect to the new template is required to be fed to the machine. This process is very tedious which requires frequent updating of the rules every time a new document is to be introduced, wherein first a human has to understand the document to frame the rules and then update the same in the machine.

In view of the foregoing, there is a need for a machine capable of understanding and capturing relevant dynamic fields in the documents which are provided in small numbers with large variations. Further, there is a need for handling the variations in the documents, classification of documents and also updating the system itself for further variations in the documents.

SUMMARY

An embodiment provides a system for classification of documents. The system comprises of at least one processor, wherein the processor of the system is configured to receive a digital copy of an input document. The system comprises of a first neural network model and a second neural network model. The first neural network model is trained using a first training dataset comprising documents having different templates. The processor is configured to recognize and extract entities and location of the entities in the input document using the first neural network model. The processor is further configured to classify whether the input document belongs to at least a template of the documents of the first training dataset using the second neural network model.

The second neural network model comprises a graphical neural network. The graphical neural network is configured to receive the extracted entities and location of the entities in the input document from the first neural network model and encode the received information relating to extracted entities and location of the entities in the input document. The second neural network model further comprises a linear classifier configured to receive the encoded information from the graphical neural network. A plurality of confidence scores for the input document is generated wherein each of the confidence scores corresponds to a unique template of the documents of the first training dataset. A threshold value to classify whether the input document belongs to at least a template of the documents of the first training dataset is determined. The input document is classified as belonging to at least a template of the documents of the first training dataset, if at least one of the generated confidence scores of the input document matches or exceeds the threshold value. The input document is classified as not belonging to at least a template of the documents of the first training dataset, if none of the generated confidence scores of the input document matches or exceeds the threshold value.

BRIEF DESCRIPTION OF DRAWINGS

Embodiments are illustrated by way of example and not limitation in the FIGURES of the accompanying drawings, in which like references indicate similar elements and in which:

FIGS. 9A-10C depicts examples of entity extraction and classification of input documents.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
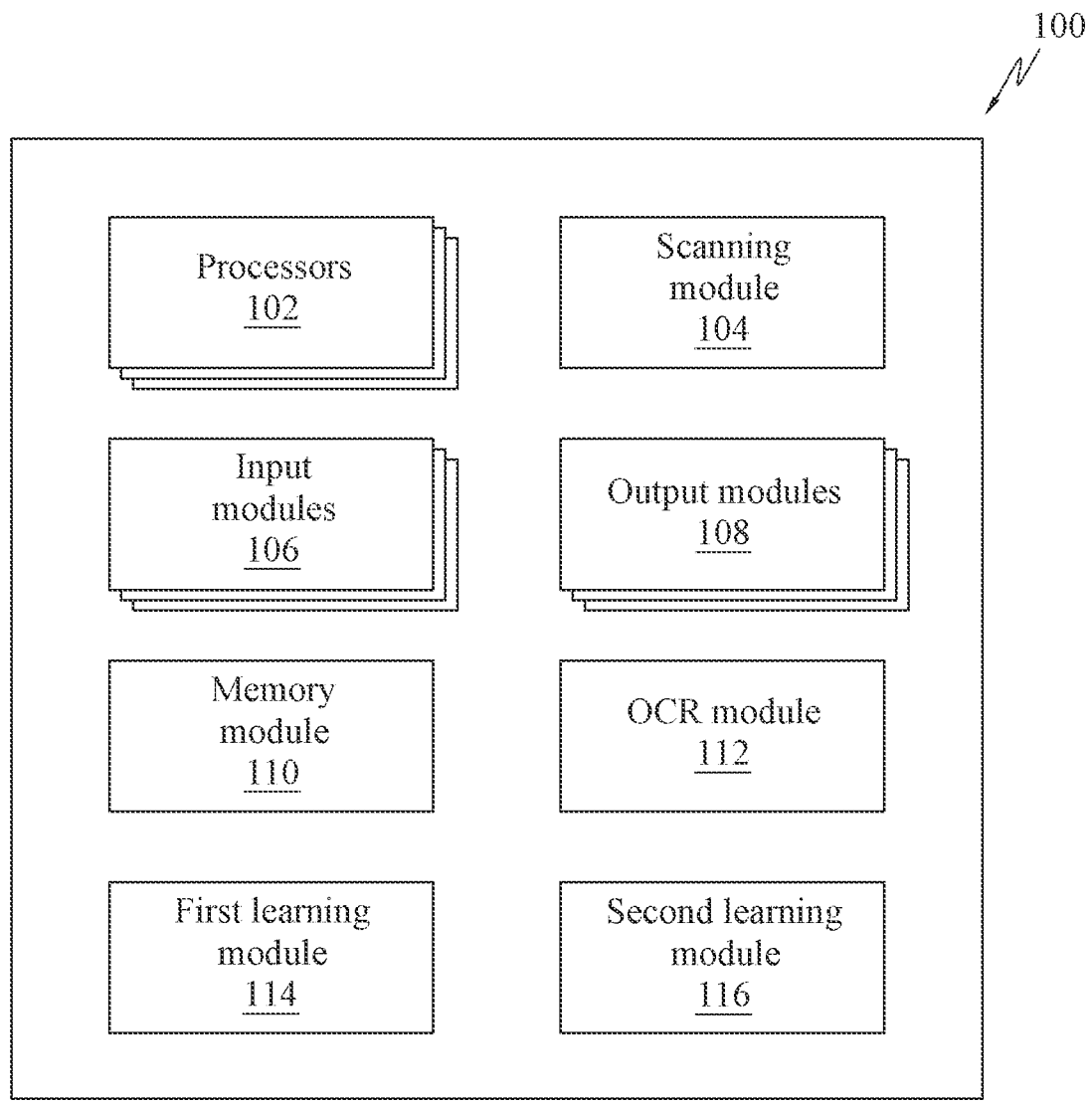
FIG. 1 illustrates a block diagram of a system 100 for classification of documents.
Figure 7:
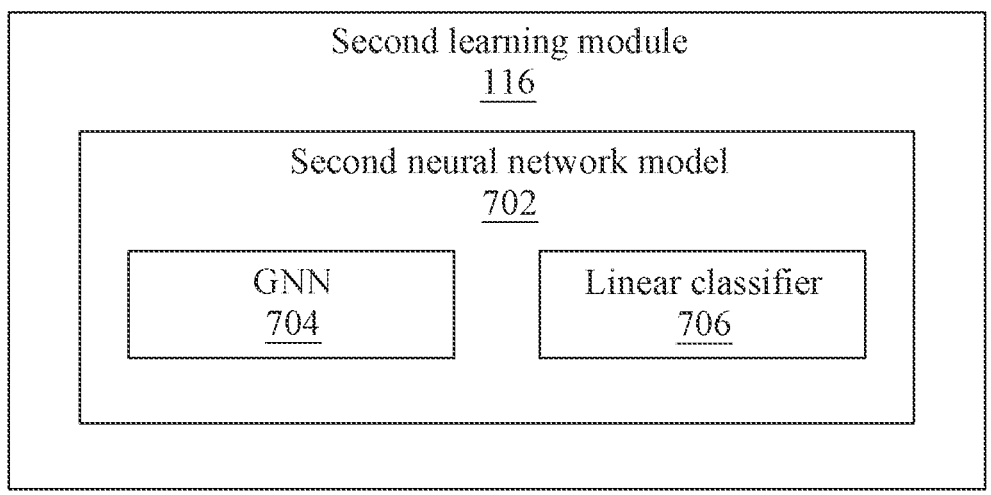
FIG. 7 illustrates a block diagram of the second learning module 116.

FIG. 1 illustrates a block diagram of a system 100 for classification of documents. The system 100 may comprise of one or more processors 102, a scanning module 104, input modules 106, output modules 108, a memory module 110, an OCR module 112, a first learning module 114 comprising of a first neural network model 202 (refer FIG. 2) and a second learning module 116 comprising of a second neural network model 702 (refer FIG. 7).

In an embodiment, the processor 102 may be implemented in the form of one or more processors 102 and may be implemented as appropriate in hardware, computer-executable instructions, firmware, or combinations thereof. Computer-executable instruction or firmware implementations of the processor 102 may include computer-executable or machine-executable instructions written in any suitable programming language to perform the various functions described.

In an embodiment, the scanning module 104 may be configured to scan a document and further convert it into a computer-readable format.

In an embodiment, the input modules 106 may provide an interface for input devices such as keypad, touch screen, mouse and stylus among other input devices. The input modules 106 may include camera or scanner.

In an embodiment, the output modules 108 may provide an interface for output devices such as display screen, speakers, printer and haptic feedback devices, among other output devices.

In an embodiment, the memory module 110 may include a permanent memory such as hard disk drive, may be configured to store data, and executable program instructions that are implemented by the processor 102. The memory module 110 may be implemented in the form of a primary and a secondary memory. The memory module 110 may store additional data and program instructions that are loadable and executable on the processor 102, as well as data generated during the execution of these programs. Further, the memory module 110 may be volatile memory, such as random-access memory and/or a disk drive, or non-volatile memory. The memory module 110 may comprise of removable memory such as a Compact Flash card, Memory Stick, Smart Media, Multimedia Card, Secure Digital memory, or any other memory storage that exists currently or may exist in the future.

In an embodiment, the OCR module 112 may be configured to extract text from the digital image of the input document.

In an embodiment, the first learning module 114 may comprise of the first neural network model 202, and the second learning module 116 may comprise of the second neural network model 702. The first neural network model 202 and the second neural network model 702 may be trained using a first training dataset, wherein the first training dataset may comprise of documents having different templates. The documents of the first training dataset may comprise 'N' different templates. As an example, the first training dataset may comprise 10 different templates and 10 documents may be provided for each of the different templates.

The documents of the first training dataset may also comprise of large amount of text, wherein both the text and the template of the documents of the first training dataset may be used for training of the first neural network model 202 and the second neural network model 702, respectively.

In an embodiment, the first training dataset may comprise of semi-structured and structured documents that may be used for training of first and second neural network models 702.

In an embodiment the first neural network model 202 and the second neural network model 702 may be trained to perform the task of information/entity extraction and template classification on an input document, respectively.

In an embodiment, the first neural network model 202 may be further trained in a supervised manner, to recognize the named entities present in the text in an input document as a downstream task. The first neural network model 202 may be provided with few samples of semi-structured and structured documents with annotations to train the first neural network model 202 in a supervised manner to recognize the named entities present in the document after training for the same documents without annotations. The first neural network model 202 may also be trained to locate the named entities using context and locations of the named entities. With training the first neural network model 202, the first neural network model 202 may be capable of learning the nuances between the entities which in turn helps the first neural network model 202 in processing variations in the documents.

Figure 2:
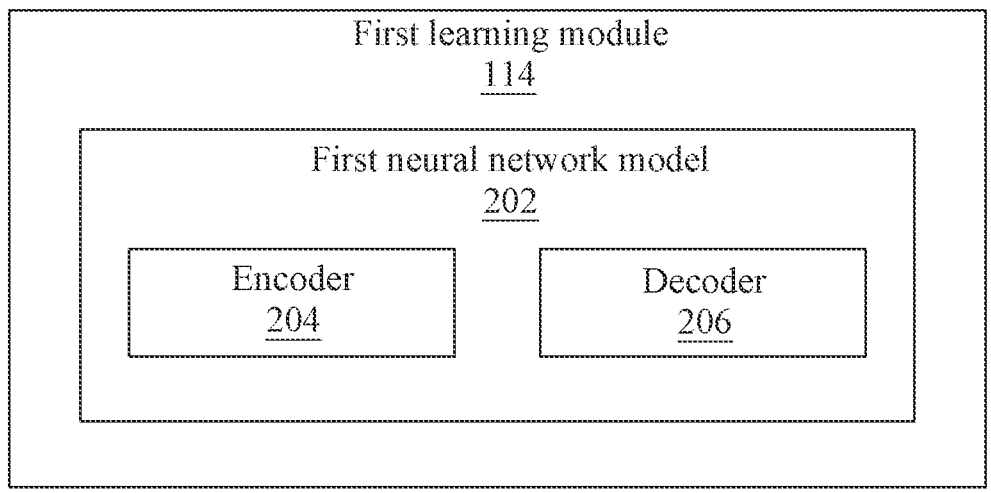
FIG. 2 illustrates a block diagram of the first learning module 114.

FIG. 2 illustrates a block diagram of the first learning module 114, in accordance with an embodiment. The first learning module 114 comprises of the first neural network model 202, wherein the first neural network model 202 may comprise of an encoder 204 and a decoder 206. The encoder 204 may be configured to encode information extracted from an input document, wherein information extracted from the input document may be configured to be converted from textual format to numerical format.

In an embodiment, the decoder 206 may be configured to decode the information encoded by the encoder 204. The decoder 206 may be configured to use the numerically encoded information to recognize the named entities present in the document.

Figure 3:
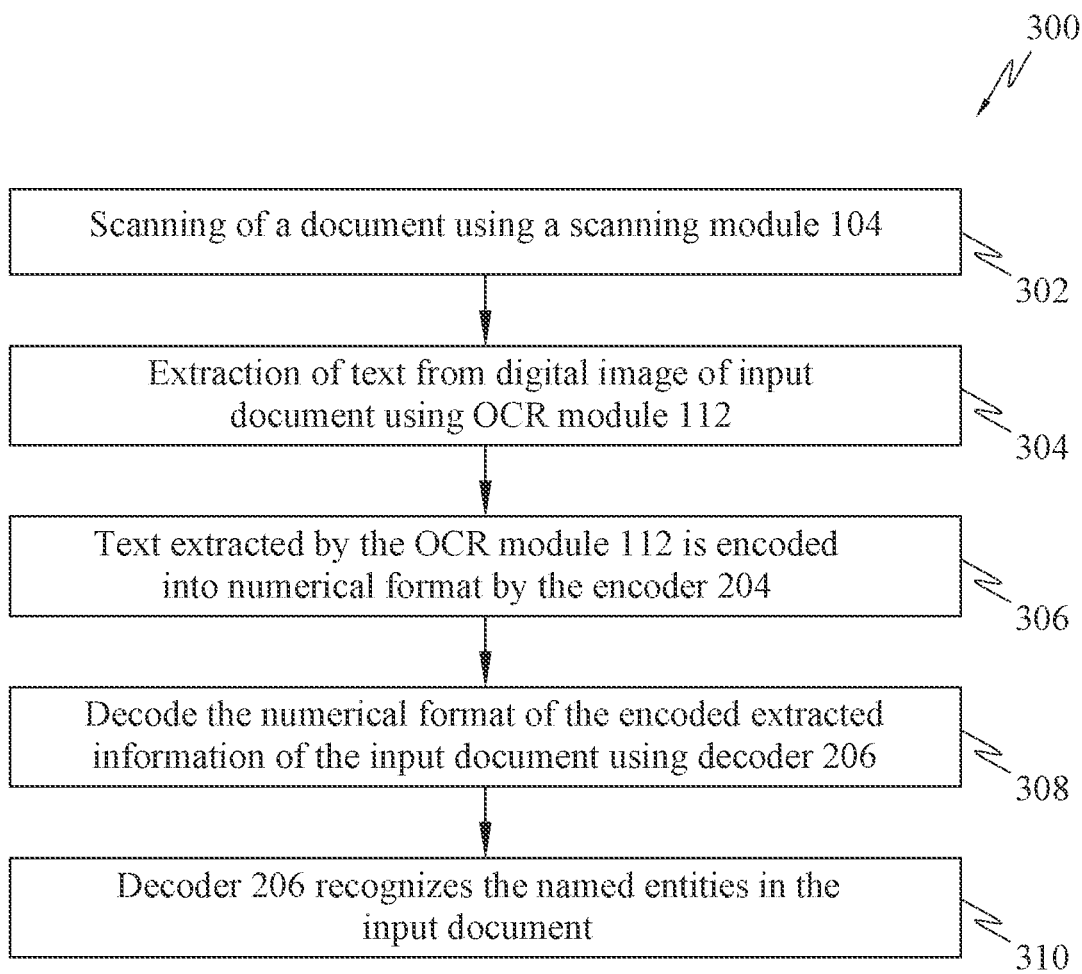
FIG. 3 illustrates a basic flowchart 300 depicting the extraction of entities using encoder 204 and decoder 206 approach.

FIG. 3 illustrates a basic flowchart 300 depicting the extraction of entities using encoder 204 and decoder 206 approach.

At step 302, an input document may be scanned by a scanning module 104, wherein the input document may be converted to a digital image.

At step 304, the OCR module 112 may be configured to extract text from the digital image of the input document.

At step 306, the extracted text from the digital image of the input document is received by the encoder 204, wherein the extracted text is encoded to a numerical format from the textual form.

At step 308, the encoded information is received by the decoder 206, wherein the decoder 206 is configured to decode the numerical format of the encoded extracted information of the input document.

At step 310, the decoder 206, upon decoding the encoded extracted information, recognizes named entities present in the document.

For example, the input document may comprise of entities like, but not limited to, person, organization, location, address, date, amount, identification number, contact number, ticket number and card number. The processor 102 may be configured to extract words from the input document and thereby extract the entities and the location of the entities using the first neural network model 202, wherein the first neural network model 202 comprises of an encoder 204 and a decoder 206, wherein information from the input document is encoded into numerical format from the textual format and the encoded numerical format is used by the decoder 206 to recognize the entities present in the input document thereby allowing extraction of the entities and location of the entities.

Figures 4, 5A, 5B:
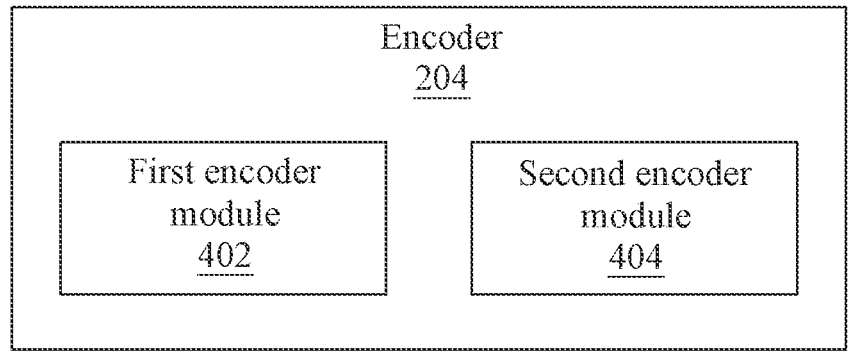
FIG. 4 illustrates a block diagram of the encoder 204.
FIG. 5A depicts notation of positional feature of entities.
FIG. 5B depicts notation of relational feature of entities.

FIG. 4 illustrates a block diagram of the encoder 204, in accordance with an embodiment. The encoder 204 may comprise of a first encoder module 402 and a second encoder module 404. The first encoder module 402 may be configured to encode words that may be extracted from the input documents. The second encoder module 404 may be configured to encode the locations of the words extracted from the input documents. The encoder 204 may be further configured to concatenate the encoded words and the encoded location of the words of the input document by the first encoder module 402 and the second encoder module 404, respectively.

In an embodiment, the first encoder module 402 may be, but not limited to, a transformer-based language model 402. The transformer-based language model 402 may be initially trained using the first training dataset in an unsupervised manner. The transformer-based language model 402, upon training using the first training dataset, may be capable of predicting next possible words from the trained text and already processed set of words. The transformer-based language model 402 may be configured of giving rich representation to a word based on its context. The transformer-based language model 402 may be used as a first stage of encoding. For example, when a document is scanned, the text segments are extracted from the document using OCR module 112. Upon extracting the text segments, the text segments are then passed into the transformer-based language model 402, wherein the transformer-based language model 402 may be configured to create feature vector representations for each of the extracted words.

In an embodiment, an unsupervised in-domain fine-tuning of the transformer-based language model 402 may be performed for better utilisation of the large volume of semi-structured and structured data for training of the first neural network model 202. Fine-tuning of the transformer-based language model 402 may help it in understanding the types of documents being passed through the transformer-based language model 402 or the documents being processed.

In an embodiment, the transformer-based language model 402 may be configured to be fine-tuned using a Masked Language Modelling (MLM). MLM may be configured to help the transformer-based language model 402 in learning semantic information from context by randomly masking portions of words of sentences from input documents and thereby making the transformer-based language model 402 to reconstruct the original sentence.

In an embodiment, the second encoder module 404 may be, but not limited to, a graph layer based on graphical neural network 404 (GNN). GNN 404 may be configured to be positioned after the transformer-based language model 402. The GNN 404 may be positioned in a way that output of the transformer-based language model 402 and information of neighbouring node may be input to the GNN 404. GNN 404 may be used as a second stage of encoding, wherein the location information which may be missed in the transformer-based language model 402 may be covered.

GNN 404 may be used so that the visual and relational information of a text field could be encoded into end-to-end model as edges and nodes.

In an embodiment, the input document may be configured to be transformed into an undirected graph containing nodes and edges, wherein each node may represent a word and have its representation initialized with the word representation from the transformer-based language model 402 plus few extra hand engineered word features such as word shape, numeric ratio, alphabetic and character ratio, among others. Each node may be configured to have a set of edges that may be configured to be connected to the nearest neighbouring nodes from four directions i.e., top, bottom, left and right. Each node is configured to obtain information from its neighbouring nodes at an instant timestamp and thereby use that information to update its own internal representation. The final output of the GNN 404 module is a set of rich node representations that is trained and which in turn has learnt to encode the visual and relationship information of the input document.

In an embodiment, each of the feature vectors generated by the encoder 204 for a word may comprise of, but not limited to, an entity attribute vector, a positional vector, a relational vector and a shape vector.

In an embodiment, the entity attribute vector may represent the label of an entity. The entity attribute vector may be label of the entity attribute such as Person, Address, Date and Amount, among others. The entity attribute may be, but not limited to, a one-hot encoding vector comprising of 1's and 0's or an integer that may be drawn from the list of all entities that may be considered for template identification. The entities may be uniquely identified and mapped to a specific integer or vector in the process.

In an embodiment, the positional vector may represent the position of the entity in the input document. The positional attribute may represent four points of a bounding box surrounding an entity under consideration. The format for representing the positional feature may be (y, x, h, w). For example, referring to FIG. 5A, for the $i^{th}$ entity, notations may be ($y^i$, $x^i$, $h^i$, $w^i$), wherein $y^i$ is the top value of the $i^{th}$ entity, $x^i$ is the left value of the $i^{th}$ entity, $h^i$ is the height of the $i^{th}$ entity, and $w^i$ is the width of the $i^{th}$ entity in an input document.

In an embodiment, the relational vector may represent the positional difference between one entity and another entity in the input document. For example, referring to FIG. 5B, the relational vector may represent difference between the $i^{th}$ entity and $j^{th}$ entity. The format of notation may now be ($y^i$-$y^j$, $x^i$-$x^j$, $h^j$, $w^j$), wherein $y^i$-$y^j$ is difference between the top value of the $i^{th}$ entity and $j^{th}$ entity, $x^i$-$x^j$ is difference between the left value of the $i^{th}$ entity and $j^{th}$ entity, $h^j$ is the height of the $j^{th}$ entity, and $w^j$ is the width of the $j^{th}$ entity in an input document. During computing, $y^i$-$y^j$ and $x^i$-$x^j$ may take both negative and positive values, depending on the position of the corresponding entities.

In an embodiment, the shape vector may represent shape of the entity. The shape vector may represent the data shape or type in the document. The shape vector may be, but not limited to, one-hot encoding vector comprising of 1's and 0's or an integer from the list of all data types.

In an embodiment, documents belonging to "N" templates may be considered to be belonging to the first training dataset. The documents of the first training dataset may comprise M (the number of unique entities) entities from all the N-templates. It shall be noted that all the documents may or may not contain all the M entities. Some of the entities may not be present in the documents of a specific template.

Now, if a document comprises of "M" named entities, feature vectors for each of the named entities may be constructed as having entity attribute vector, shape vector, positional vector and (M−1) relational vector. For the sake of understanding it is assumed that the document comprises of not more than hundred (100) entities. If the number of named entities in the document that is to be input to second neural network model 202 is less than the number of unique named entities in the documents of the first training dataset (i.e., M<100), the remaining values are assigned with 0 (zero) to make a uniform representation of the vector as input to the neural networks. A matrix with M×(2[entity attribute and shape attribute]+M×4[position and relation attributes]) for each of the "N" documents with "M" entities may be generated.

In an embodiment, the first learning module 114 comprising of the first neural network model 202 further comprises of the decoder 206. The decoder 206 may be configured to receive the concatenated encoded information from the encoder 204 and decode the received concatenated encoded information. The decoder 206, upon decoding the encoded information, may be configured to assign a label to each of the entities of the input document.

In an embodiment, the decoder 206 may be based on Bi-directional long short term memory—Conditional random field (BiLSTM-CRF).

In an embodiment, the concatenated encoded information from the transformer-based language model 402 and the GNN 404 of the encoder 204 is then passed through the BiLSTM-CRF module. By using a sequential network in the BiLSTM-CRF module, extraction task is transformed into a sequence tagging task. BiLSTM may be configured to use both past and future context information to recompute the encoded information from the encoder 204 modules, and by using the CRF, transitional relationship between each of the entity label may be modelled. The BiLSTM-CRF model may be configured to decode the encoded information into a set of labels such as person, address, date, location and identification number, among others.

Figure 6:
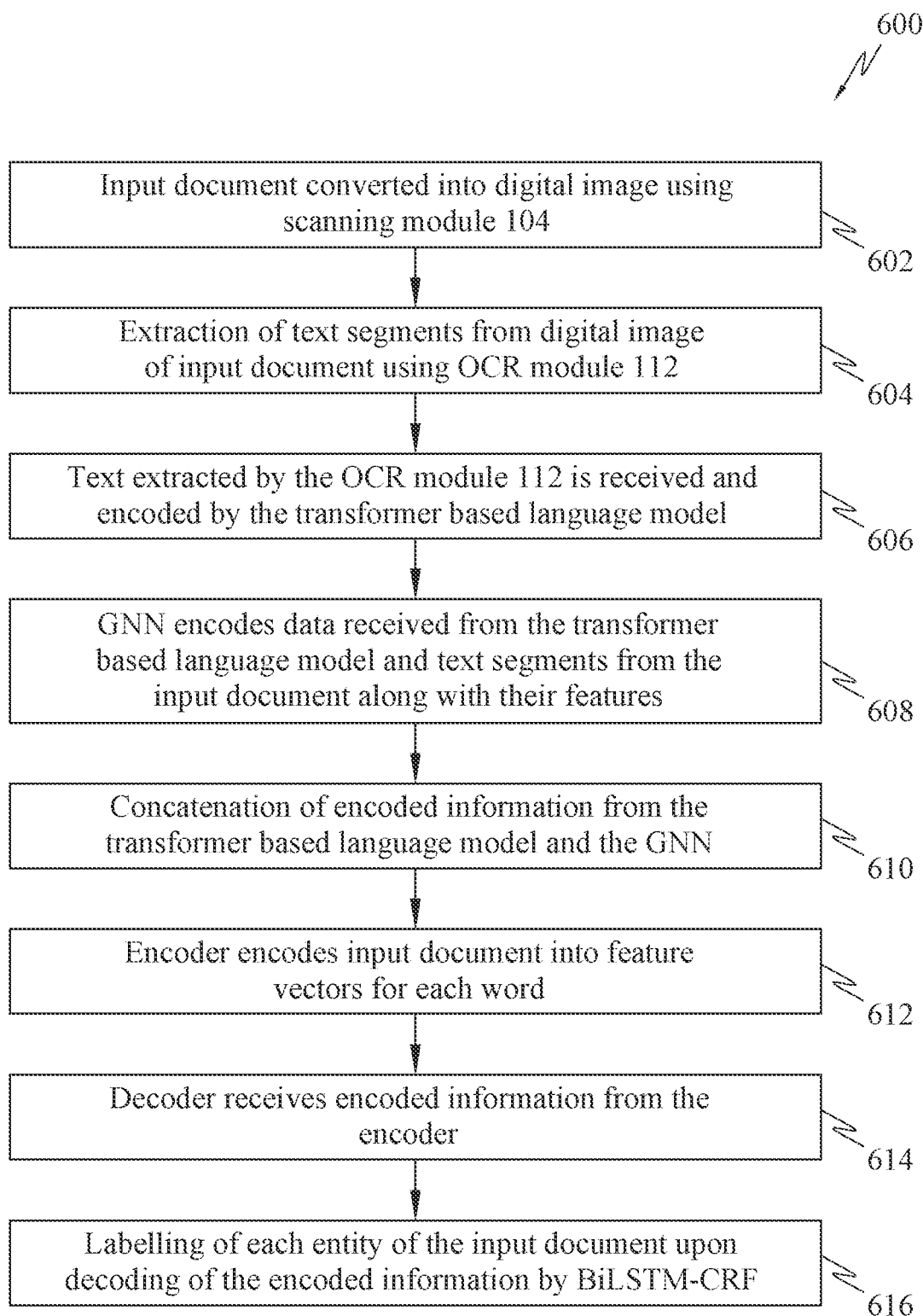
FIG. 6 illustrates a basic flowchart 600 depicting the encoding of words extracted from an input document.

FIG. 6 illustrates a basic flowchart 600 depicting the encoding of entities extracted from an input document.

At step 602, an input document is converted into a digital image using a scanning module 104, preferably a scanner or an image capturing device.

At step 604, text segments from the digital image are extracted using OCR module 112.

At step 606, extracted text segments from the input document is received and encoded by the transformer-based language model 402.

At step 608, GNN 404 receives the extracted text segments from the input document and the encoded information from the transformer-based language model 402 as its input. Here the GNN 404 is configured to be second stage encoding, wherein information such as extracted text segments and their features from the input document and the encoded information from the transformer-based language model 402 is encoded by the GNN 404.

At step 610, the encoded information from the transformer-based language model 402 and the encoded information from the GNN 404 is concatenated.

At step 612, the encoder 204 may encode the input document into feature vectors for each of the words of the input document which is input to the decoder 206.

At step 614, the feature vectors of each of the words are received by the decoder 206.

At step 616, the encoded information is decoded using the BiLSTM-CRF thereby labelling each of the text segments of the input document. Here, the encoded information from the encoder 204 is received by the decoder 206, wherein the BiLSTM uses past and future context information for recomputing the encoded information, and transitional relationship between each entity label is modelled using CRF. The output of the decoder 206 is a labelled format of the input document.

In an embodiment, the first learning module 114 comprising of the first neural network model 202 may be trained using a first training dataset comprising documents having different templates. The first neural network model 202 may be trained to recognize and extract entities and location of the entities in the input documents.

In an embodiment, the second learning module 116 may comprise of second neural network model 702. The second neural network model 702 may be configured to be trained by the same first training dataset comprising of documents with different templates. Each of the documents of the first training dataset may be assigned a first identifier "1" to "N", wherein the identifier indicates that the template of the document belongs to at least a template of the documents of the first training dataset.

In an embodiment, the second neural network model 702 may be further trained using a negative sampling document that may have a template different from the 'N' templates of the documents of the first training dataset. The negative sampling document may be assigned a second identifier as "N+1", wherein the second identifier is configured to indicate that the template of the negative sampling document does not belong to the templates of the documents of the first training dataset.

In an embodiment, the second neural network model 702 may comprise of a graphical neural network. The graphical neural network may be trained using location of the named entities with other contextual entities to classify a document to be from the "N" template document or different. The graphical neural network may be configured to receive the extracted entities and location of the extracted entities in the input document from the first neural network model 202 and encode the received information relating to the extracted entities and location of the entities in the input document.

In an embodiment, the second neural network model 702 may comprise of a linear classifier 706 and a graphical neural network (GNN) 704. The linear classifier 706 may be configured to perform various tasks, details of which will now be discussed in greater detail.

In an embodiment, the linear classifier 706 may be configured to generate confidence scores for the input document, wherein each of the generated confidence scores corresponds to a unique template of the documents of the first training dataset.

In an embodiment, the linear classifier 706 may be further configured to determine a threshold value for classifying the input documents. The threshold value may allow in determining whether the input documents belongs to at least a template of the documents of the first training dataset. The threshold value may be determined based on "N" or "N+1" template of documents of the first training dataset along with the negative sampling document used for training of the second neural network model 702.

In an embodiment, the second neural network model 702 may be configured to automatically update the threshold value every time the second neural network model 702 is trained with a different negative sampling document having a template different from the templates of the documents of the first training dataset.

In an embodiment, the linear classifier 706 based on the output from the graphical neural network, the threshold value and the first training dataset may be configured to classify an input document as belonging to the first training dataset comprising "N" template documents or not.

In an embodiment, at the training stage of the second neural network model 702, a different class of documents may be created and negative sample of documents that do not belong to the "N" template of documents may be used for updating the threshold value at every iteration of training the second neural network model 702. This allows a variable/flexible threshold value, which works efficiently as compared to system 100 with constant/fixed threshold value.

Figure 8:
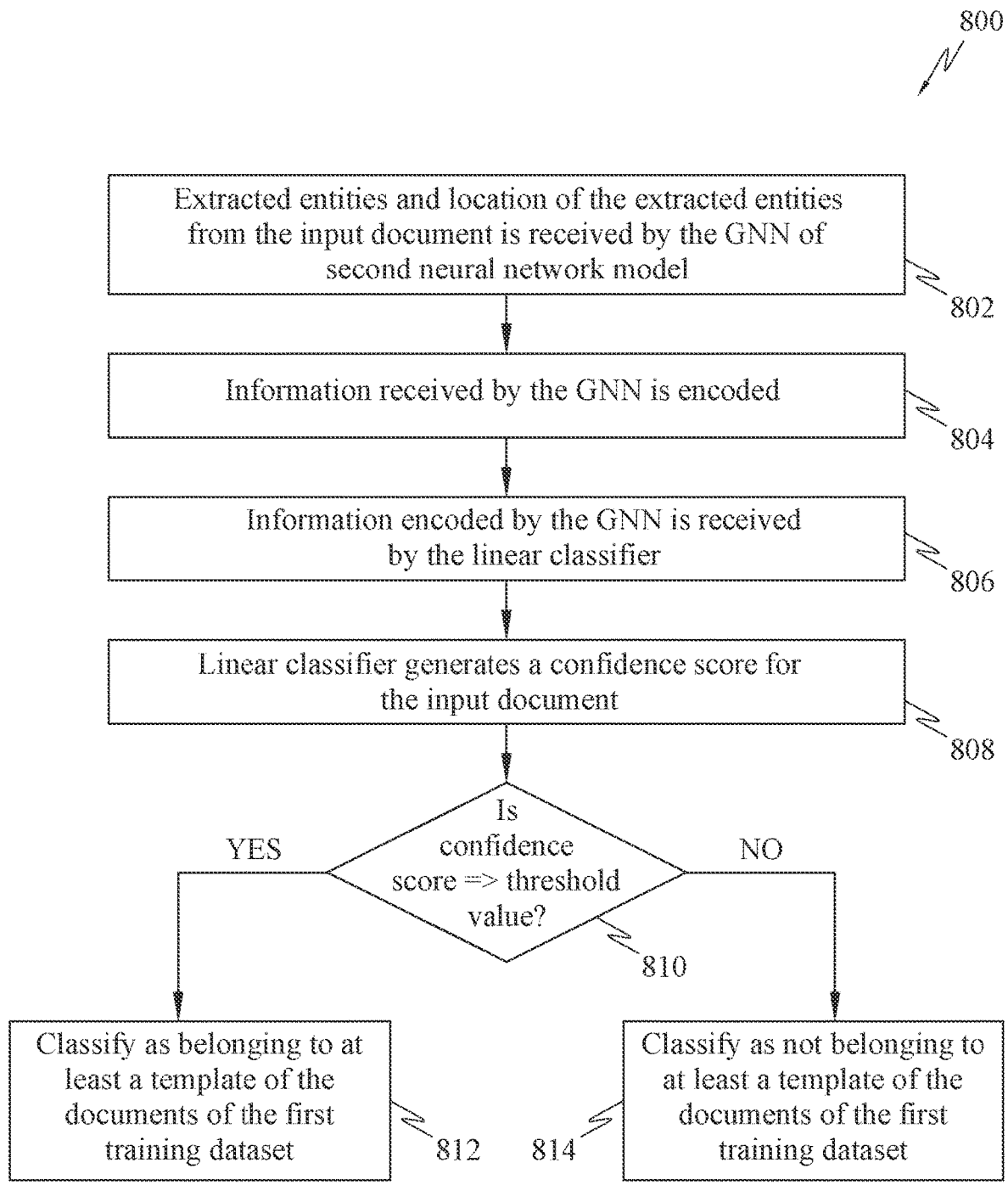
FIG. 8 illustrates a flowchart 800 depicting process of classification of input documents.

FIG. 8 illustrates a flowchart 800 depicting process of classification of input documents.

At step 802, the second neural network model 702 comprising of Graphical Neural Network (GNN) 704 receives the extracted entities and location of the entities in the input document from the first neural network model 202.

At step 804, the received information relating to extracted entities and location of the entities in the input document are encoded by the GNN 704.

At step 806, linear classifier 706 receives the encoded information by the GNN 704.

At step 808, the linear classifier 706 generates a confidence score for the input document based on the information encoded by the GNN 704 that correspond to the input document. Here the linear classifier 706 is configured to compare the encoded information received from the GNN 704 with the "N" template documents of the first training dataset and generate a confidence score for the input document with respect to each of the "N" template documents of the first training dataset.

At step 810, the generated confidence score is compared with the threshold value.

At step 812, the input document is classified as belonging to at least a template of the documents of the first training dataset when at least one of the generated confidence scores of the input document matches or exceeds the threshold value.

At step 814, the input document is classified as not belonging to at least a template of the documents of the first training dataset when none of the generated confidence scores of the input document matches or exceeds the threshold value.

A process for classification of documents is now discussed with an example invoice. However, the process should not be restricted to invoices and may be employed for different types of documents.

Figure 9A:
Figure 10A:
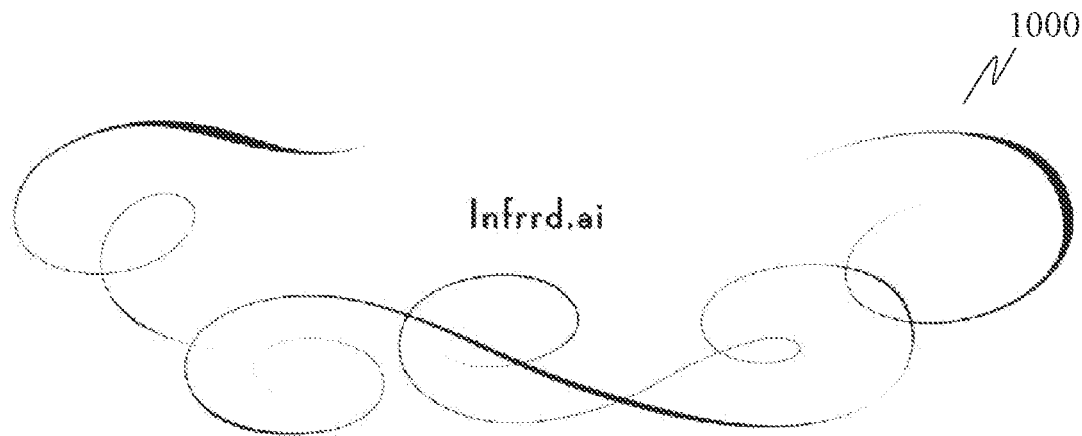
Figure 10A:
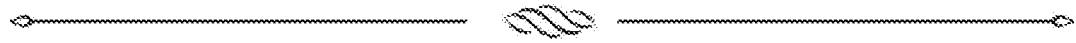

An input document 900 and 1000 (an invoice) (Refer FIGS. 9A and 10A) may be fed to a system 100 for extracting entities of the input document and determine whether the input document belongs to a template of the documents used for training the system 100. The documents used for training the system 100 may be stored in the memory module 110.

Figure 10B:
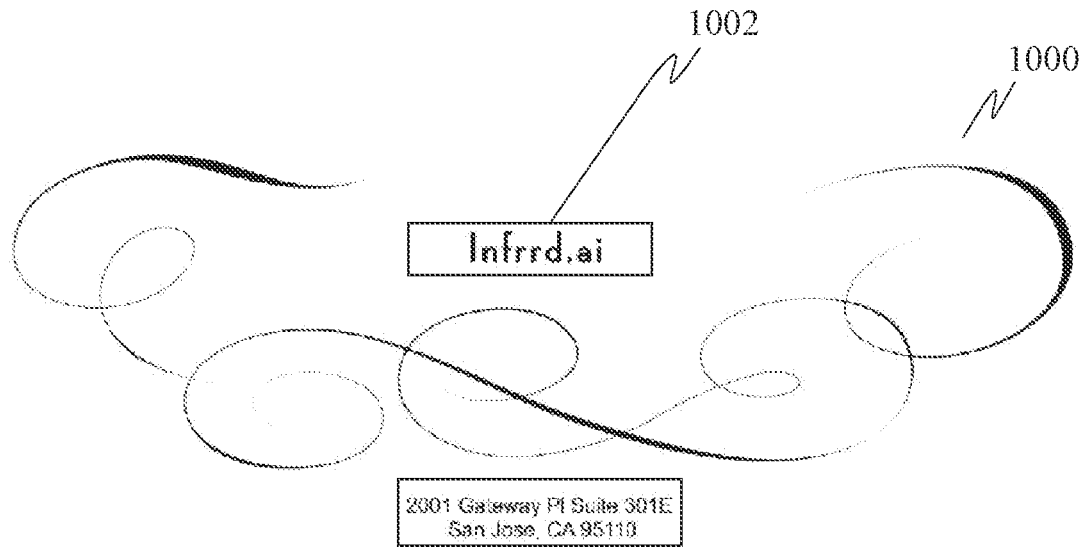

In an embodiment, the system 100, upon receiving the input document 900 and 1000 may be configured to detect entities present in the input document and generate bounding boxes 902 and 1002 (Refer FIGS. 9B and 10B) around each of the detected entities, thereby locating the position of the detected entities in the input document. The detected entities may be extracted by the system 100 using the first neural network model 202. The process of extracting and labelling of entities in the input document using encoder 204 and decoder 206 is explained in the foregoing and is therefore not repeated for the sake of brevity.

Figure 10C:
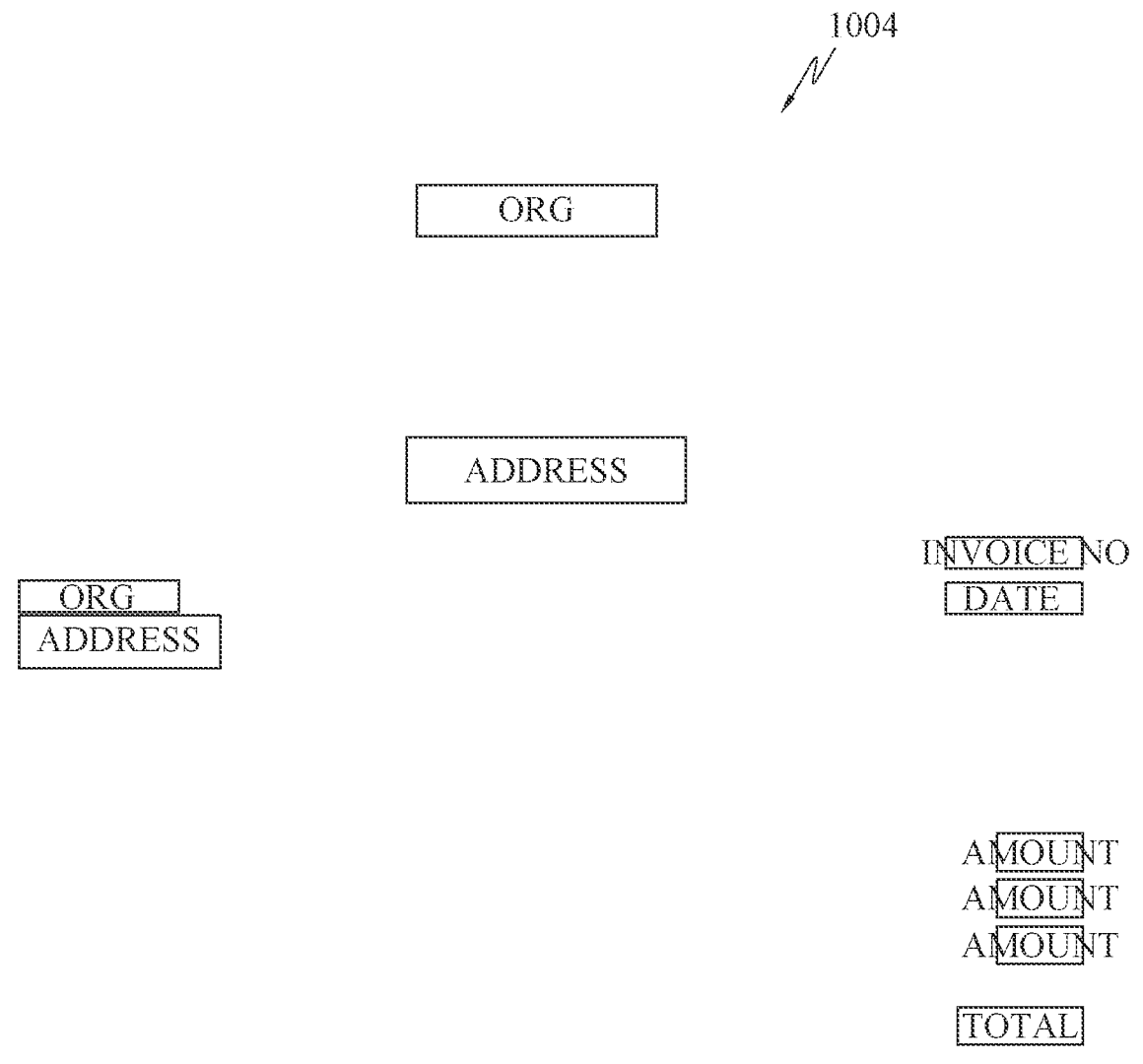

In an embodiment, the extracted entities may be labelled (Refer FIGS. 9C and 10C) using the first neural network model 202. Upon labelling the extracted entities, using the information of the labelled entities along with the location of the respective bounding boxes, the system 100 may generate a layout 904 and 1004 (template) of the extracted entities with their attributes. The system 100 may be configured to generate confidence score for the generated layout with respect to each of the documents with templates used for training of the system 100 that may be stored in the memory module 110.

In an embodiment, the generated confidence score is compared with the threshold value determined by the system 100 during the training process, thereby determining if the input document belongs to the set of documents used for training of the system 100 that may be stored in the memory module 110.

In an embodiment, each of input documents with the extracted entities may have a unique part of the document structure. The document structure may or may not change for every document.

In another embodiment, structure of input document with entities may change and these changes may have a unique property that may be reserved for that kind of document. All of this information relating to the document structure with unique part and unique property may be used by the system 100 for classifying the input documents.

In addition to the foregoing, the first neural network model 202 may be trained to extract the fields without any template matching approach as it may be done in cases of prior art. Here, the step of template validation may not be done as an initial step. The system 100 with the first neural network model 202 and the second neural network model 702 may be trained to extract entities/fields from the document without the template matching approach. Furthermore, image or pattern in the input document may not necessarily be an entity/field for template validation. A simple logo or fixed entity like "Name" may be sufficient and may be used for template validation. The system 100 may be trained not to look for fixed patterns in the input document, however, the system 100 may be trained to look for somewhat fixed patterns of entities or commonalities among the entities. The system 100 may be trained to pick such entities from the input documents and understand general terminologies of the entities that helps the system 100 in processing the input documents in a much better way.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader scope of the system 100 and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A system for template invariant information extraction, the system comprising at least one processor configured to:
   receive a digital copy of an input document;
   recognize and extract entities and location of the entities in the input document using a first neural network model, wherein the first neural network model is trained using a first training dataset comprising documents having different templates; and
   classify, using a second neural network model, whether the input document belongs to at least a template of the documents of the first training dataset, wherein the second neural network model comprises:
      a graphical neural network configured to:
         receive the extracted entities and location of the entities in the input document from the first neural network model; and
         encode the received information relating to extracted entities and location of the entities in the input document; and
      a linear classifier configured to:
         receive the encoded information from the graphical neural network;
         generate a plurality of confidence scores for the input document, wherein each of the confidence scores corresponds to a unique template of the documents of the first training dataset;
         determine a threshold value to classify whether the input document belongs to at least a template of the documents of the first training dataset;
         compare each of the generated confidence scores of the input document with the threshold value;
         classify the input document as belonging to at least a template of the documents of the first training dataset, if at least one of the generated confidence scores of the input document matches or exceeds the threshold value; and
         classify the input document as not belonging to at least a template of the documents of the first training dataset, if none of the generated confidence scores of the input document matches or exceeds the threshold value.

2. The system as claimed in claim 1, wherein the second neural network model is trained using:
   the first training dataset comprising documents having different templates, wherein each of the documents of the first training dataset is assigned a first identifier, wherein the first identifier indicates that the template of the document belongs to at least a template of the documents of the first training dataset; and
   at least a negative sampling document having a template different from the templates of the documents of the first training dataset, wherein the negative sampling document is assigned a second identifier, wherein the second identifier indicates that the template of the negative sampling document does not belong to the templates of the documents of the first training dataset.

3. The system as claimed in claim 2, wherein the second neural network model is configured to update the threshold value every time the second neural network model is trained with a different negative sampling document having a template different from the templates of the documents of the first training dataset.

4. The system as claimed in claim 1, wherein the first neural network model comprises:
   an encoder comprising:
      a first encoder module configured to encode the entities extracted from the input document; and
      a second encoder module configured to encode location of the entities extracted from the input document;
      wherein the encoder is configured to concatenate the encoded entities and the encoded location of the entities of the input document by the first encoder module and the second encoder module respectively; and
   a decoder configured to:
      receive the concatenated encoded information from the encoder; and
      decode the received concatenated encoded information to assign a label to each of the entities of the input document.

5. The system as claimed in claim 4, wherein the first encoder module is a transformer-based language model.

6. The system as claimed in claim 4, wherein, the second encoder module is a graphical neural network configured to encode the visual and relational information of the entities extracted from the input document into nodes and edges.

7. The system as claimed in claim 6, wherein the second encoder module is configured to transform the input document into an undirected graph comprising of nodes and edges, wherein each node represents one of the entities of the input document.

8. The system as claimed in claim 4, wherein the encoder is configured to generate a feature vector for each of the entities of the document, wherein each of the feature vector comprises:
   an entity attribute vector representing the label of the entity;
   a positional vector representing the position of the entity in the input document;
   a relational vector representing the positional difference between one entity and another entity in the input document; and
   a shape vector representing the shape of the entity.

9. The system as claimed in claim 8, wherein the first neural network model is configured to:
   determine the number of unique named entities in the documents of the first training dataset; and
   if the number of named entities in the document that is input to the second neural network model is less than the number of unique named entities in the documents of the first training dataset, assign a zero value to the fields corresponding to the missing named entities.

10. The system as claimed in claim 9, wherein the encoder is configured to generate a matrix for each of the document that is input to first neural network model.

11. The system as claimed in claim 4, wherein the first encoder module is trained using Masked Language Modeling (MLM) to determine a representation of the entity based on the context.

12. The system as claimed in claim 4, wherein the first decoder comprises a Bi-directional long short term memory-Conditional Random Field (BiLSTM-CRF) module.

\* \* \* \* \*